United States Patent [19]

Hanna

[11] 4,441,226
[45] Apr. 10, 1984

[54] CAR WASHING APPARATUS

[76] Inventor: Daniel C. Hanna, 1133 SW. Rivington Dr., Portland, Oreg. 97201

[21] Appl. No.: 404,287

[22] Filed: Aug. 2, 1982

[51] Int. Cl.³ .............................................. B60S 3/06
[52] U.S. Cl. .............................. 15/53 AB; 15/DIG. 2
[58] Field of Search ............. 15/53 A, 53 AB, DIG. 2

[56] References Cited

U.S. PATENT DOCUMENTS

| | | | |
|---|---|---|---|
| 3,035,293 | 5/1962 | Larson | 15/53 AB |
| 3,350,733 | 11/1967 | Hanna | 15/53 AB |
| 3,506,995 | 4/1970 | Larson et al. | 15/53 AB |
| 3,581,334 | 6/1971 | Follis | 15/53 AB |

Primary Examiner—Edward L. Roberts

Attorney, Agent, or Firm—Klarquist, Sparkman, Campbell, Leigh & Whinston

[57] ABSTRACT

Apparatus for detecting the position of an object, for example, a licence plate, on the exterior of a car during the washing thereof includes a rotary brush which is driven by a hydraulic motor and is mounted on a pivotable structure adapted to move relative to and scrub the surface of the car as it advances therepast along a conveyor. A detection mechanism is positioned on an overhead structure to detect the position of the brush support structure corresponding to a position of the brush near the location of the license plate. A control mechanism responds to detection of the license plate and opens a fluid control valve, thereby reducing the rate of fluid flow to the hydraulic motor to slow the speed of brush rotation until the brush travels beyond the license plate.

14 Claims, 4 Drawing Figures

CAR WASHING APPARATUS

BACKGROUND OF THE INVENTION

1. Field of the Invention

This invention relates to car washing apparatus having a rotary brush, and more particularly, to apparatus for detecting the position of objects, such as license plates, mounted on the exterior of a car to prevent detachment thereof during a washing operation.

2. Description of Related Prior Art

In car washing installations of the type wherein a car is scrubbed by rotary brush apparatus either urged against a car advancing along a conveyor or advanced along the exterior of a stationary car, there has been known heretofore means to prevent the detachment of a license plate as the brush passes therepast.

For example, car washing installations in Europe accomplish this task by using brush apparatus comprised of a pair of counterrotating brushes stacked on a vertically disposed shaft which provides a common axis of rotation for both brushes. The brushes are positioned at a height so that the point where the two brush ends meet corresponds to the midpoint of the height of the license plate mounted on the car. As the counterrotating brushes travel along the front or rear end of the car and encounter a license plate mounted thereon, they exert on the vertical ends of the license plate forces of approximately equal magnitudes and opposite directions to reduce the tendency of a brush to grab and pull at the ends thereof.

This technique of applying compensating brush rotational forces is practiced in Europe primarily because European license plates, unlike those in the United States, are characterized by long horizontal and short vertical dimensions. License plates of this type, therefore, present short vertically disposed ends which enhance the probability of a sufficient balancing of forces under the counterrotating brush technique.

The counterrotating brush technique for reducing the tendency of rotating brushes to detach a license plate during a scrubbing operation suffers from several disadvantages.

First, counterrotating brushes can effectively protect a license plate mounted on a car at only a standardized height above the ground surface. License plates located at other heights cannot experience the balanced scrubbing forces that constitute the operating principle of the technique. In addition, a license plate of the type found in the United States, even if mounted at the height required under this technique, would experience along its longer vertical dimension a substantially nonuniform distribution of forces exerted by the counterrotating brushes which would introduce a twisting force and thereby tend to bend or detach the license plate.

Second, the mechanism for counterrotating two brushes mounted on a common shaft is necessarily complicated by a requirement for additional and redundant components to drive and control brushes rotating in opposite directions.

Finally, the lengths of the upper and lower brushes are not dictated by considerations such as interchangeability for replacement purposes or optimum positioning for increased scrubbing efficiency, but merely by the anticipated mounting height of the license plates on the cars to be washed.

An important object of this invention, therefore, is to provide means to detect the position of an object, such as a license plate, on the exterior of a car during the washing thereof by slowing the speed of brush rotation upon detection of the location of the brush near the object.

Another important object of this invention is to provide a detection means wherein the brush drive mechanism rotates the individual component brushes in the same direction.

A further important object of this invention is to provide a detection means that is an integral part of the rotary brush drive mechanism, thereby requiring minimal additional drive components.

Still another important object of this invention is to provide a detection means that is effective irrespective of the shape of the object or its location on the car.

Another object of this invention is to provide a detection means that is independent of the configuration or size of the individual component brushes of the rotary brush apparatus.

Another object of this invention is to provide a detection means that is adaptable to different types of conventional rotary brush drive mechanisms, such as electrical and hydraulic mechanisms.

Another object is to provide a detection means suitable for mounting on either passive or mechanized support and guide structures for a rotary brush.

SUMMARY OF THE INVENTION

This invention overcomes the deficiencies presented in the prior art reviewed hereinabove by providing means to detect the position of a rotary brush moving along the exterior of a car as it encounters the known location of an object mounted thereon.

The particular means to detect the position of license plates herein disclosed by way of example is applicable to rotary brushes driven by a hydraulic motor and mounted to a fully passive support structure that guides brush movement about the front end, side, and rear end of the car as the car advances along a conveyor track. An elongated element operatively connected to an electromechanical circuit is positioned to detect a particular orientation of the support structure corresponding to the positioning of the brushes near the known location of a license plate mounted on the car. Upon detection of the particular position of the brush on the car, the circuit responds by actuating a control valve to divert fluid flow from the hydraulic motor to slow the speed of brush rotation.

More specifically, the invention comprises a rotary brushing mechanism preferably including two substantially cylindrically shaped brushes stacked endwise along a common shaft. The longitudinal axis of the shaft is vertically disposed, its upper end being rotatably mounted on the outer end of the outer arm of a pivotable support structure. A hydraulic drive motor is operatively connected to the shaft to rotate each brush simultaneously in the same direction.

A hydraulic fluid circuit in communication with a fixed displacement hydraulic pump and the hydraulic motor delivers hydraulic fluid to drive the motor and thereby turn the shaft. Included in the hydraulic fluid circuit is a valve which controls the flow rate of fluid delivered to the hydraulic motor to change the speed of brush rotation to a desired magnitude when the rotating brushes encounter the known position of the license plate mounted on the exterior of a car.

The pivotable support structure holds the brushes in the path of the advancing car. When the brushes engage the front end of the car, the support structure urges the rotating brushes against the car and moves pivotally to guide them along the front end to a side thereof, rearwardly along a side of the car, and across the rear end of the car as it advances therepast.

As the brushes move along the car, the brush support structure traces a regular pattern of movement corresponding to the location of the brushes on the exterior of the car. Since a particular orientation of the support structure corresponds to a specific location of the brush apparatus on the exterior of a car, detection of license plates mounted at known locations on the car is accomplished by a determination of the corresponding position of the brush support structure.

Whenever the brush support structure is oriented to guide the brushes across the license plate located generally centrally on the ends of the car, a portion of the support structure contacts an elongated element extending from a mechanical switch included within an electromechanical circuit. Upon closure of the switch, the circuit produces a signal to actuate the control valve to divert fluid flow from the hydraulic motor, thereby to decrease the speed of brush rotation.

Although a means to detect license plates has been described in connection with rotary brushes driven by a hydraulic mechanism and mounted on a fully passive support and guide structure, this invention need not be restricted for use with such drive and support mechanisms. In addition, this invention is readily adaptable to detect the known positions of other objects mounted on the exterior of the car.

The foregoing and other objects, features, and advantages of the present invention will become more apparent from the following detailed description which proceeds with reference to the accompanying drawings.

DETAILED DESCRIPTION

Configuration and Structure of the Brushing Mechanisms

Figure 1:
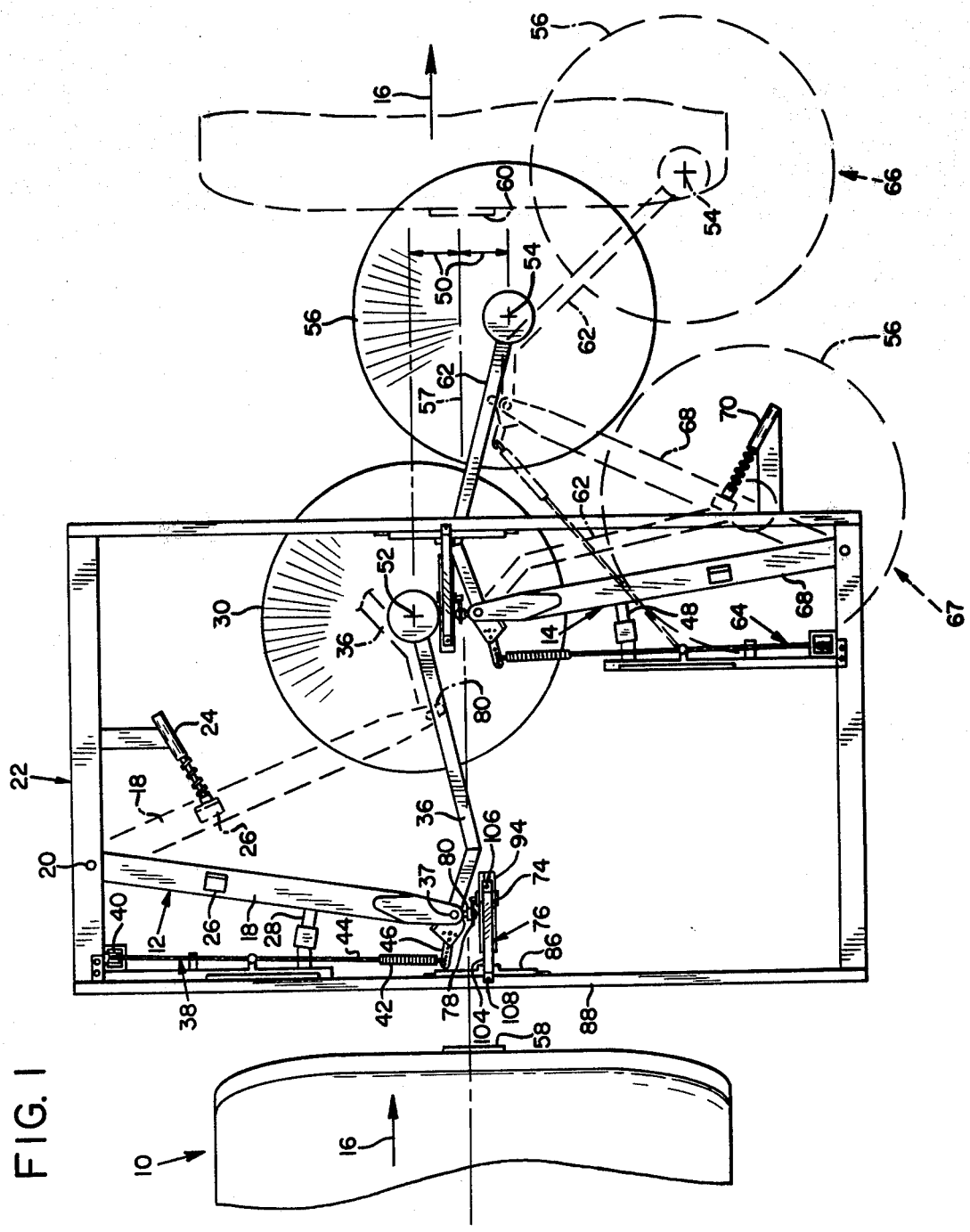
FIG. 1 is a fragmentary plan view of the brushing mechanism depicting in phantom the relationship of the position detector to the brush support structure in several operating positions.

FIG. 1 shows a preferred "wraparound" brushing mechanism supporting rotary brushes in a car wash installation incorporating the present invention. The overall structure and operation of a typical wraparound brushing mechanism is disclosed in U.S. Pat. No. 3,350,733. However, it will be appreciated that successful operation of the present invention is not restricted to brushing mechanisms of this type.

With reference to FIG. 1, a car washing operation is accomplished by advancing car 10 along track 11 (FIG. 2) through a bay having car brushing mechanisms 12 and 14 arranged in allochiral relation and spaced apart along the length of the conveyor. Brushing mechanisms 12 and 14 operate in complementary fashion so that brushing mechanism 12 initially scrubs sequentially the left front end, left side, and left rear end of the car. Upon engagement with car 10 advancing in direction 16, brushing mechanism 14 commences an identical brushing sequence on the right half portion of the car.

Each brushing mechanism has identical support structures; therefore, only mechanism 12 will be described in detail. Mechanism 12 includes inner arm 18 with its inner end mounted to swing about fixed pivot axis 20 on stationary framework 22 supporting the brushing mechanisms. Forward overtravel stop 24 mounted on stationary framework 22 limits the forward or counterclockwise pivotal movement of inner arm 18 by engaging stop member 26 mounted on the top of inner arm 18. Similarly, rest stop member 28 mounted to the side of inner arm 18 facing the approaching car limits the rearward or clockwise pivotal movement of inner arm 18 by engaging a portion of framework 22.

Figure 2:
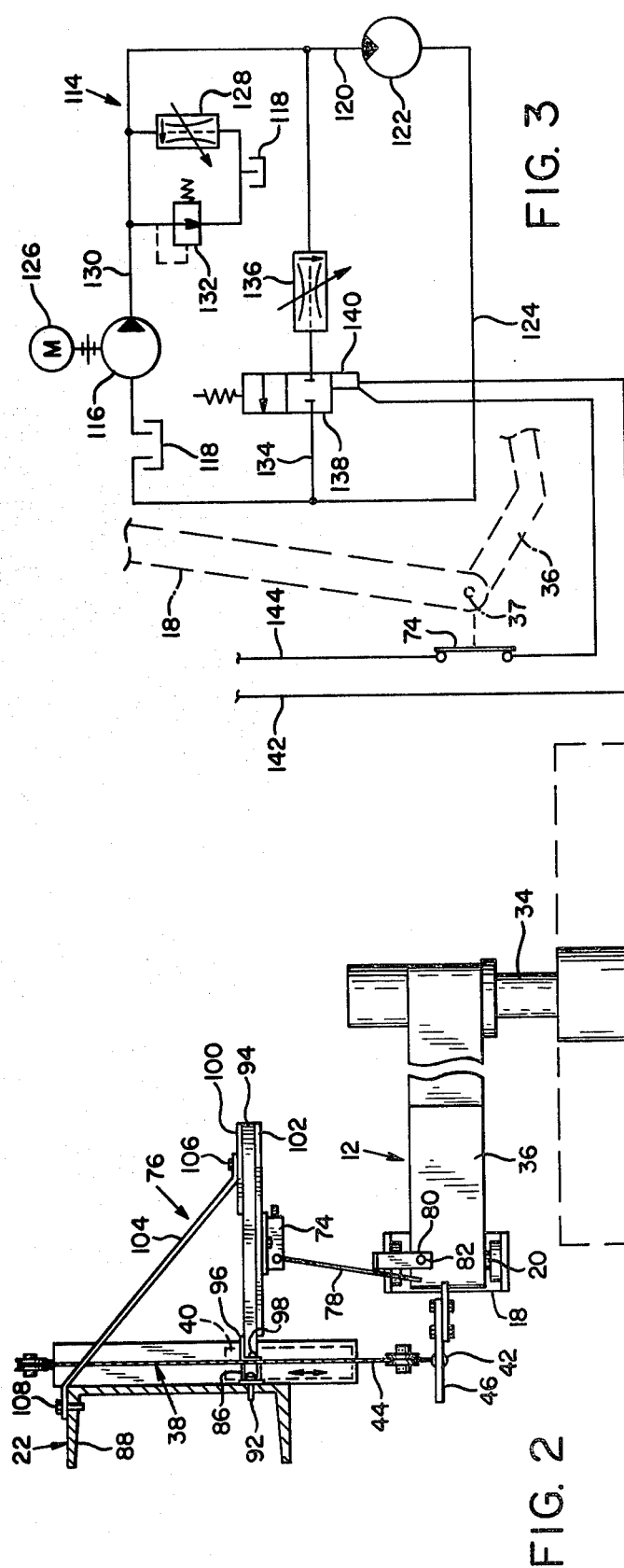
FIG. 2 is a fragmentary side elevation view taken partly in section of the left side brushing mechanism shown in engagement with the position detector probe.

With reference to FIG. 2, upper rotary brush 30 and lower rotary brush 32 are stacked endwise and attached to vertically disposed shaft 34 which is rotatably mounted to the outer end of outer arm 36. A hydraulic motor (not shown) drives shaft 34 and thereby rotates brushes 30 and 32. Outer arm 36 moves about pivot axis 37 (FIG. 1) positioned at the outer end of inner arm 18 to facilitate movement of the rotary brushes along the exterior of the car.

As shown, brushes 30 and 32 are of generally cylindrical shape. Brush 30 is comprised of lightweight, cloth-like material suitable for scrubbing the side windows of the car. The larger diameter of brush 30 is specified to promote more effective engagement with the window surface. Brush 32 is comprised of material which becomes very heavy when laden with water and, therefore, is suitable for cleaning the generally dirtier metallic portions of the car. The length of each brush is specified by the dimensions and vertical positioning of portions of the car it must clean. Hereinafter, only the upper brush will be referred to in the description of the operation of the invention.

The pivotal movement of brushing mechanism 12 is controlled by the applied force of the advancing car and a counterweight mechanism 38 (FIGS. 1 and 2) that includes counterweight 40, which is connected to an end of spring 42 by cable 44. The other end of spring 42 is inserted into the free end of extension horn 46, which is secured to the inner end of outer arm 36.

Operation of the Brushing Mechanisms

With reference to FIG. 1, brushing mechanisms 12 and 14 depicted in solid lines engage framework 22 by means of rest stop members 28 and 48, respectively, while in the rest position as shown. A rest position for each brushing mechanism represents the start position in preparation for and the end position after engagement with the car as it advances toward and recedes from, respectively, the rotary brushes.

Dimension 50 indicates the offset of axes of rotation 52 and 54 of brushes 30 and 56, respectively, from centerline 57 of front license plate 58 and rear license plate 60 mounted centrally on the ends of car 10, which advances along a conveyor (not shown) positioned generally centrally within installation framework 22. As shown, each brushing mechanism extends well beyond, and thereby provides overlapping coverage of, the entire area of both the front and rear license plates.

With reference to FIG. 1, brushing mechanism 14 is shown in two phantom positions to illustrate the folding action of outer arm 62 resulting from forces exerted by the advancing car and counterweight mechanism 64. Position 66 represents the condition of extreme extension brushing mechanism 14 assumes only as brush 56 turns about the right front corner of the car. Position 67 represents the completely folded configuration brushing mechanism 14 assumes as brush 56 moves along the side of the car.

As it advances in direction 16, car 10 engages and deflects the brushing mechanism simultaneously to clear the path of the car and to move the rotary brushes across the surface thereof.

During the travel of brush 56 across the right front end of the car, inner arm 68 pivotally moves in a clockwise sense from rest stop member 48 toward forward overtravel stop 70. After brush 56 turns about the right front corner, outer arm 62 folds in a clockwise sense toward inner arm 68. Outer arm 62 reaches the completely folded position 67 after the brush has moved past the mounting location of a side view mirror. After brush 56 has turned about the right front corner, inner arm 68 returns to rest stop member 48. Inner arm 68 is urged against rest stop member 48 as outer arm 62 remains in the folded position to follow along the length of and urge brush 56 against the right side of the car.

As brush 56 turns about the right rear corner, inner arm 68 remains positioned against rest stop member 48 as outer arm 62 unfolds to urge the brush against the rear end of the car. As brush 56 proceeds along the right rear end of the car toward centrally located rear license plate 60, outer arm 62 pivotally moves in a counter-clockwise sense as brushing mechanism 14 assumes its rest position.

The inner arm of the brush support structure for a wraparound mechanism described hereinabove, therefore, contacts the rest stop member whenever the rotary brushes engage a license plate mounted generally centrally on an end of a car.

Position Detector

General Description

Figure 4:
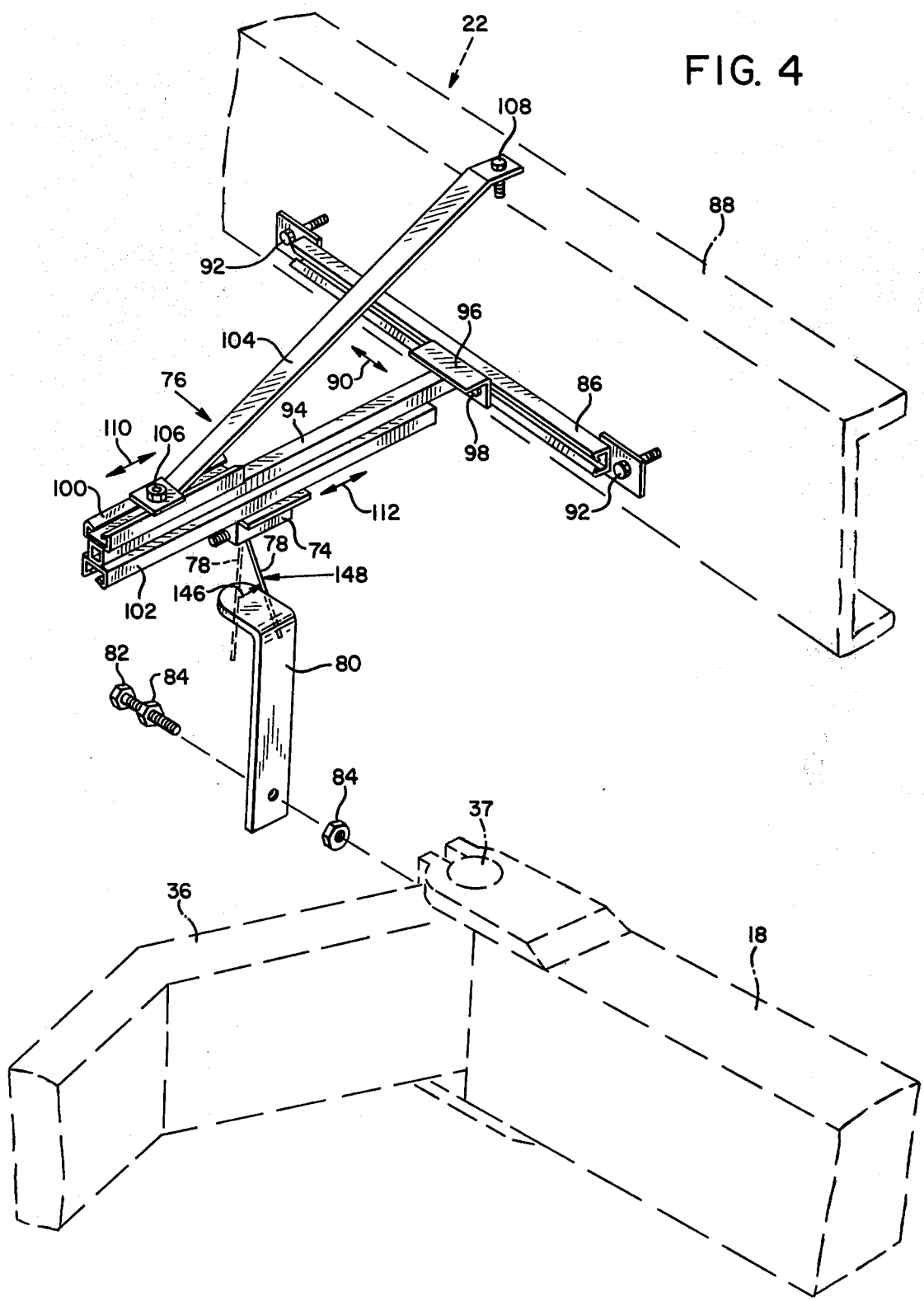
FIG. 4 is an enlarged isometric view taken partly in section looking from the left side of the conveyor at the apparatus for the position detector associated with the left side brush support shown in phantom.

With reference to FIGS. 1, 2, and 4, the position detector of the present invention includes limit switch 74 which is mounted on an overhead structure 76 comprising a portion of framework 22. The actuating mechanism for limit switch 74 is an elongated, downwardly extending probe element 78 which engages cam 80 extending upwardly from the inner end of outer arm 36 of brushing mechanism 12 to detect the orientation of the brush support structure corresponding to its rest position. Bolt 82 and nuts 84 secure cam 80 to outer arm 36 as shown in FIG. 4.

Cam 80 follows the path described by the movement of outer arm 36 as the brush scrubs the car in the operational sequence described hereinabove for brushing mechanism 14.

Limit switch 74 comprises the portion of an electromechanical circuit, which produces an electric signal to actuate the rotary brush hydraulic fluid control circuit to slow the speed of brush rotation whenever cam 80 engages probe 78.

Mounting and Alignment Structure

The following description of the mounting and alignment structure for the position detector associated with brushing mechanism 12 is directed specifically with reference to FIG. 4. The discussion applies similarly to the position detector associated with brushing mechanism 14.

With reference to FIGS. 1 and 2, and especially FIG. 4, limit switch 74 is slidably mounted for independent adjustment in two directions in a horizontal plane to ensure engagement of probe 78, which is a component thereof, with cam 80 for the desired orientation of the inner and outer arms of the brush support structure. The following discussion is directed to a particular alignment of limit switch 74 so that cam 80 contacts probe 74 whenever the brushes encounter a license plate located generally centrally on an end of the car. However, the limit switch may be positioned to detect objects located elsewhere on the car.

Slide bracket 86 is mounted to U-shaped cross member 88 of framework 22. Slide bracket 86 is disposed transversely of path 16 (FIG. 1) of car 10 and provides the means to adjust the position of probe 78 in direction 90 as will be described. Bolts 92 secure bracket 86 to cross member 88.

Bracket 94 with right angle bracket 96 welded to one end thereof is slidably mounted in bracket 86. Each of two bolts 98 (only one is shown in FIGS. 2 and 4) is passed through a bore in bracket 96 and is secured by a kindorf nut (not shown) inserted in the channel of bracket 86. Loosening bolts 98 permits bracket 94 to slide along bracket 86 in direction 90.

Slide brackets 100 and 102 are welded to the upper and lower sides, respectively, of bracket 94. The lower end of brace 104 is slidably mounted to bracket 100 by bolt 106 and a kindorf nut (not shown), and the upper end is secured to the top of cross member 88 by bolt 108. The adjustable end of brace 104 slides in direction 110 to provide an adjustment in a horizontal plane for the T-shaped structure formed by brackets 86 and 94. Limit switch 74 is slidably mounted to bracket 102 by a pair of bolts and kindorf nuts (not shown) in the manner described hereinabove and may be adjusted in direction 112, which is coincident with conveyor path 16 of the car.

It is apparent that sufficient range of adjustment for the position of limit switch 74 is provided to ensure that probe 78 extending therefrom will engage the brush support structure as required. It will be observed that probe 78 can be moved in direction 112 when desired; however, after brace 104 is secured to cross member 88, no further adjustment in direction 90 is possible. The upper portion of cam 80 is of sufficient length to provide in effect a fine adjustment in direction 90 to ensure proper operation of the detector in accordance with the invention.

Hydraulic Fluid Drive and Control Circuit

Separate but identical hydraulic fluid drive and control circuits and electromechanical circuits associated with each brushing mechanism provide the means to reduce the speed of brush rotation whenever the probe detects that the brushes are about to encounter a license plate.

Figure 3:
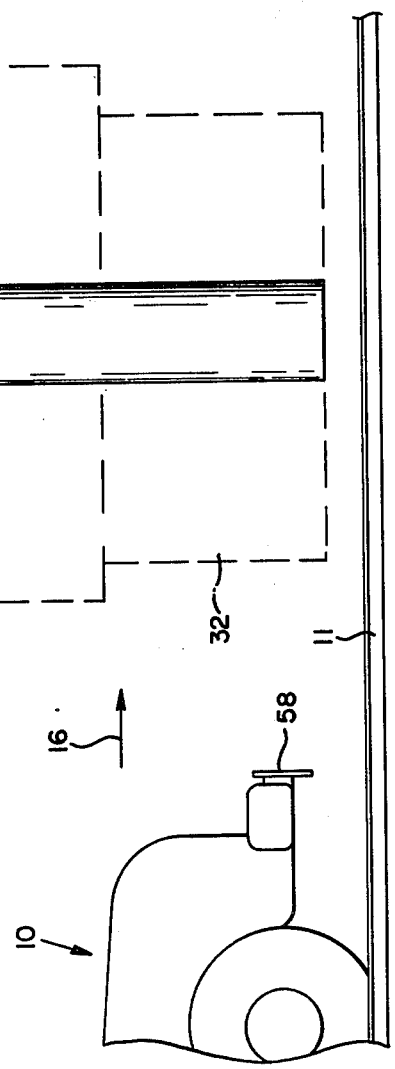
FIG. 3 is a schematic diagram showing the interaction of the electromechanical and hydraulic fluid circuits with the left side brush support structure in accordance with the invention.

With reference to FIG. 3, the hydraulic fluid drive and control circuit and the electromechanical circuit are shown schematically for brushing mechanism 12.

The hydraulic fluid circuit 114 is comprised of a primary subcircuit including fixed displacement hydraulic pump 116 which draws hydraulic pressure fluid from tank 118 and pumps it through fluid supply line 120 to the intake side of hydraulic motor 122. Hydraulic motor 122 is a fixed displacement motor which drives the rotary brushes to scrub the car. Hydraulic fluid is discharged from the output side of hydraulic motor 122 through primary return line 124 back to tank 118. Electric motor 126 continuously drives pump 116 during operation.

The quantity of fluid discharged by hydraulic pump 116 through hydraulic fluid circuit 114 is restricted by adjustable, pressure-compensated flow control valve 128, which continuously diverts fluid from high pressure line 130 of the fluid circuit to tank 118. High pressure relief valve 132 bleeds fluid from high pressure line 130 into tank 118 whenever the hydraulic circuit pressure exceeds a predetermined upper limit.

Included in the secondary subcircuit is secondary return line 134, which under the conditions described hereinbelow reduces the rate of fluid flow to hydraulic motor 122 by providing direct to tank 118 a path for a regulated quantity of fluid; flow control valve 136, and solenoid actuated valve 138. Valve 138 is a two-way, two-position normally closed valve actuatable by solenoid 140 to inhibit fluid flow through secondary return line 134 whenever solenoid 140 is de-energized. Flow control valve 136 is an adjustable, pressure-compensated valve which regulates the amount of fluid diverted from the supply line 120 to hydraulic motor 122 whenever solenoid 140 is energized. A 24 VAC power source (not shown) is applied at all times during operation to electrical conductors 142 and 144 leading to solenoid 140.

Operation of the Position Detector and Control Circuit

With reference to FIGS. 1, 2, and 4, in operation, whenever there is no car in engagement with brush 30, brushing mechanism 12 remains in its rest position and, therefore, cam 80 contacts probe 78 to actuate limit switch 74. Under these conditions, the contacts of switch 74 are closed, conducting 24 VAC to solenoid 140. The normally closed valve 138 now held open permits fluid to flow through line 134 to tank 118, thereby diverting fluid from supply line 120 to cause brush 30 to rotate at a reduced speed regulated by adjustable flow valve 136. Whenever a car first engages brush 30, the brush while rotating at reduced speed immediately scrubs front license plate 58. Inner arm 18 begins pivotally to move as the forces exerted by the advancing car and counterweight system urge brush 30 toward the left side of the car. As brush 30 moves away from license plate 58, cam 80 begins to move away from probe 78. To ensure that a small amount of pivotal movement of inner arm 18 will sustain brush rotation at the reduced speed until brush 30 clears the area near license plate 58, limit switch 74 is designed to remain closed until probe 78 reaches a vertical disposition. As shown in FIG. 4, arcuate path 146 represents the obtainable range of motion of probe 78 as it contacts cam 80 to sustain brush rotation at the slower rate. When the brushing mechanism is in its rest position, probe 78 is deflected to position 148 as shown.

After cam 80 has moved away from probe 78, limit switch 74 opens, thereby removing 24 VAC from solenoid 140 and closing valve 138 to inhibit fluid flow through line 134. Hydraulic pump 116 now delivers the preset maximum fluid flow to hydraulic motor 122 to rotate brush 30 at a greater washing speed. These conditions prevail until brush 30 approaches rear license plate 60 when cam 80 will again engage probe 78 to close switch 74 and energize solenoid 140 to permit fluid flow through valve 138 and thereby reduce the speed of rotation of brush 30.

Having described and illustrated the principles of my invention in a preferred embodiment, it should be apparent that it may be modified in an arrangement and detail without departing from such principles. I claim all modifications coming within the scope and spirit of the following claims.

What is claimed is:

1. Apparatus for detecting a predetermined location on the exterior of a car during the washing thereof, comprising:

a rotary brush, means to rotate the brush, control means to control the speed of brush rotation, means to move the brush and car relative to each other, support means to support and hold the brush rotating at a first speed against the exterior of the car while permitting relative movement of the brush and the car to move the brush along the exterior of the car, detecting means to detect the predetermined location on the exterior of the car, and means to actuate the control means to change the speed of brush rotation to a second speed as the brush encounters the predetermined location.

2. Apparatus as in claim 1 wherein the means to rotate the brush comprises a hydraulic fluid circuit and hydraulic motor means driven by hydraulic fluid delivered through the hydraulic fluid circuit.

3. Apparatus as in claim 2 wherein the hydraulic fluid circuit comprises flow-reducing means to vary the flow of fluid delivered to the hydraulic motor means to change the speed of brush rotation.

4. Apparatus as in claim 1 which further comprises a stationary structure and wherein the detecting means comprises an element secured to the stationary structure, the element being located to contact the support means whenever the brush encounters the predetermined location.

5. Apparatus for detecting a predetermined location on the exterior of a car during the washing thereof, comprising:

a rotary brush;

hydraulic motor means to drive the rotary brush;

hydraulic fluid-pumping means;

a hydraulic fluid circuit in communication with the hydraulic motor means and the hydraulic fluid-pumping means, the hydraulic fluid circuit comprising a flow-reducing means to reduce the flow of fluid delivered to the hydraulic motor means to slow the operation thereof and thereby decrease the speed of brush rotation;

means to move the brush and the car relative to each other to move the brush along the surface of the car;

detecting means to detect the predetermined location on the exterior of the car; and means to actuate the flow-reducing means as the brush moving along the surface of the car encounters the predetermined location.

6. Apparatus as in claim 5 wherein the flow-reducing means comprises a valve actuatable to divert fluid flow from the hydraulic motor means.

7. Apparatus as in claim 5 wherein the detecting means detects the position of the brush when the brush encounters the predetermined location on the car.

8. Apparatus as in claim 7 wherein the detecting means detects the position of the brush proximal to a license plate mounted on the car.

9. Apparatus for detecting a predetermined location on the exterior of a car during the washing thereof, comprising:

a rotary brush;

hydraulic motor means to drive the rotary brush;

hydraulic fluid-pumping means;

a hydraulic fluid circuit having primary and secondary subcircuits, the primary subcircuit being in communication with the hydraulic motor means and the hydraulic fluid-pumping means, and the secondary subcircuit comprising actuatable valve means to divert hydraulic fluid flow from the primary subcircuit to slow the operation of the hydraulic motor means and thereby reduce the speed of brush rotation;

means to move the brush and car relative to each other;

support means to support and hold the brush against the car while permitting movement of the brush and the car relative to each other;

means to detect the position of the brush with respect to the predetermined location on the car; and means to actuate the valve means as the brush encounters the predetermined location where an object would be mounted.

10. Apparatus as in claim 9 wherein the object is a license plate.

11. Apparatus for detecting a predetermined location on the exterior of a car during the washing thereof, comprising:

a rotary brush;

hydraulic motor means to drive the rotary brush;

hydraulic fluid-pumping means;

a hydraulic fluid circuit in communication with the hydraulic motor means and the hydraulic fluid-pumping means, the hydraulic fluid circuit comprising a flow-reducing means to reduce the flow of fluid delivered to the hydraulic motor means to slow the operation thereof and thereby decrease the speed of brush rotation;

support means to urge the brush against the exterior of the car and to guide the brush along a path of movement to engage the front end, side, and rear end of the car;

brush positioning means operatively connected to the support means to determine the position of the brush at the predetermined location on the exterior of the car, the brush positioning means comprising:

detecting means responsive to the position of the support means to detect the orientation of the support means corresponding to a positioning of the brush at the predetermined location, and switch means responsive to the detecting means to actuate the flow-reducing means to reduce the speed of brush rotation.

12. Apparatus as in claim 11 wherein the detecting means comprises a stationary structure and an element secured to the stationary structure, the element being located to contact the support means whenever the support means guides the brush to encounter the predetermined location on the exterior of the car.

13. Apparatus as in claim 11 wherein the flow-reducing means includes a solenoid-actuated valve operable in response to actuation of the switch means to reduce fluid flow to the hydraulic motor.

14. Apparatus as in claim 11 wherein the switch means includes a switch actuated by contact between the detecting means and the support means.

* * * * *